Nov. 28, 1967     H. E. FERRILL     3,354,900
SAFETY VALVE HAVING VARIABLE AREA SECONDARY ORIFICE
Filed Feb. 24, 1965
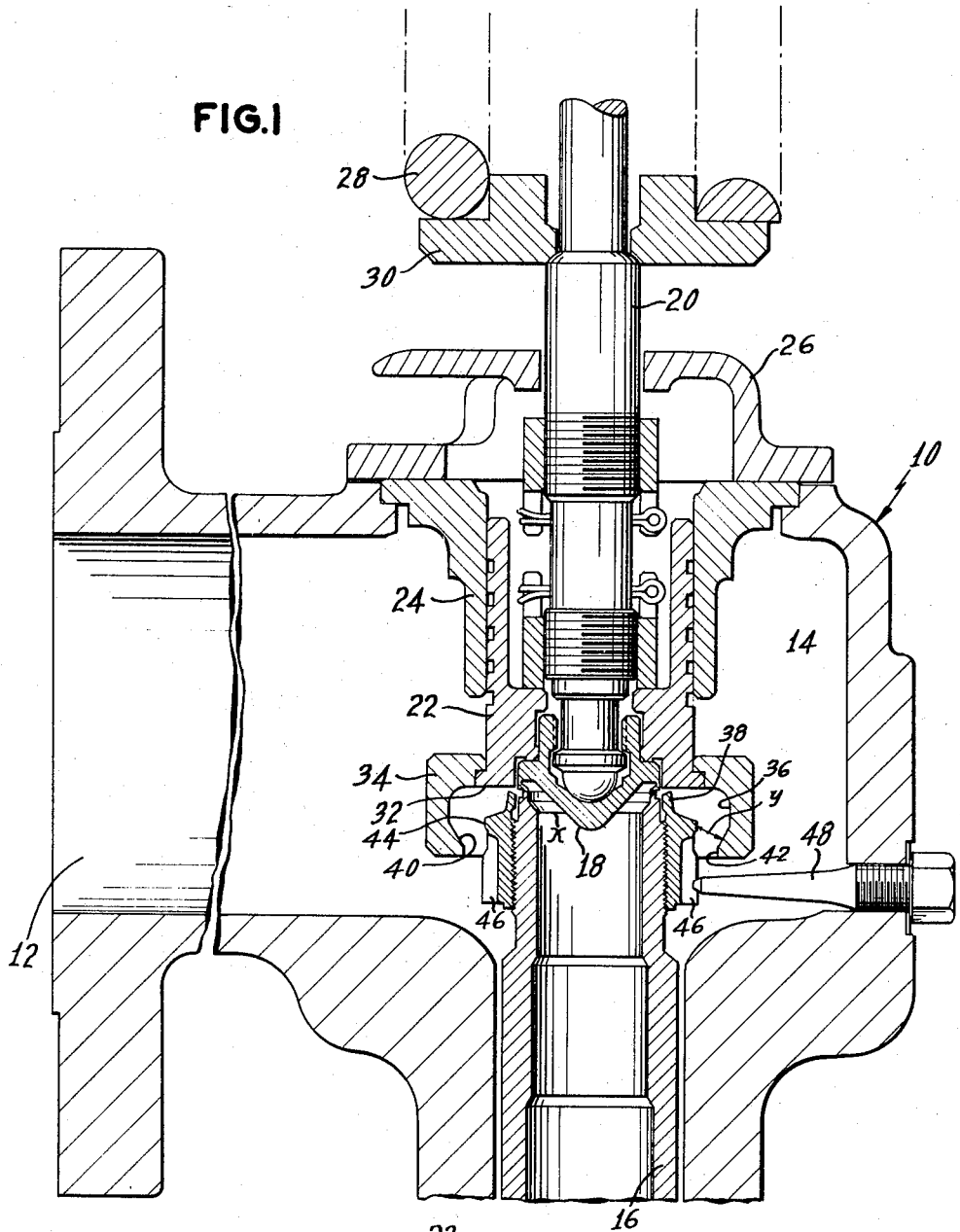
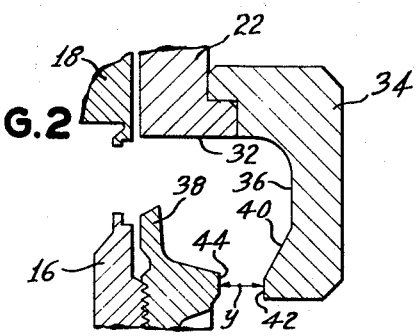
INVENTOR.
HOMER E. FERRILL
BY
George H. Baldwin
ATTORNEY United States Patent Office 3,354,900
Patented Nov. 28, 1967

3,354,900
SAFETY VALVE HAVING VARIABLE AREA
SECONDARY ORIFICE
Homer E. Ferrill, Alexandria, La., assignor to Dresser Industries, Inc., Dallas, Tex., a corporation of Delaware
Filed Feb. 24, 1965, Ser. No. 434,766
12 Claims. (Cl. 137—477)

ABSTRACT OF THE DISCLOSURE

A safety valve for relief of fluid pressure including a huddle chamber formed about the valve seat in the path of fluid flow and defining a secondary orifice which decreases in cross-sectional flow area as the valve opens toward maximum flow position.

This invention relates to valves for the relieving of pressure of a gas, including steam, and more particularly to novel improvements in spring-loaded safety valves particularly adapted for use in connection with steam pressure vessels.

Safety valves conventionally comprise a valve body having a valve seat formed at the inner end of a nozzle mounted on the valve body and providing an inlet flow passage to the valve. A valve disc is mounted for movement toward and away from the seat with the underside of the disc being exposed to the fluid pressure in the nozzle. When the force on the underside of the disc exerted by the steam pressure in the nozzle exceeds the force applied to the disc in the opposite direction by a spring, the valve disc will move away from the seat to permit the discharge of steam, thus relieving the internal pressure of the vessel to which the valve is connected.

In order to obtain fast opening or "popping" of the valve in response to the reaching of a predetermined pressure in the nozzle, it is a common practice to provide the valve with what is referred to as a huddle chamber. The huddle chamber provides a relatively large additional area for the pressure of escaping steam to act upon in a direction to open the valve disc. Additionally, the huddle chamber is often designed to provide a change in direction of the flow of steam from between the valve disc and seat with an attendant reaction force on the valve disc which also tends to open the valve.

The steam discharging from the huddle chamber passes through what is referred to as a secondary orifice which is downstream of the primary orifice of the valve. The secondary orifice is conventionally provided by the spacing of a surface fixed, although perhaps adjustably so, to the valve nozzle and a second surface which in some types of valves is fixed relative to the valve body and in others is movable with the valve disc. In the first type of valve, the area of the secondary orifice does not change with lift of the valve disc while in the latter case the flow area of the secondary orifice increases with the valve lift. In either case, the setting of the area of the secondary orifice in conventional valves must be such that the secondary orifice is small enough during valve opening to provide the desired full opening of the valve, while at the same time it is desired that the secondary orifice be relatively large as the valve disc approaches its seat from a full open position in order to achieve a short blowdown. Thus, the setting of the secondary orifice area is a matter of compromise. Accordingly, it is the primary object of the present invention to provide in a safety valve novel and improved means for assuring that the valve will fully open to achieve maximum capacity while at the same time will have a short blowdown.

It is a further object of the present invention to provide a safety valve in which the area of the secondary orifice will decrease as the valve disc lifts.

It is a further object of this invention to provide a safety valve in which the area of the secondary orifice of the valve will decrease at a greater rate during initial lift of the valve than during a later portion of the lift of the valve.

The novel features which are believed to be characteristic of this invention are set forth with particularity in the appended claims. The invention itself, however, both as to its organization and method of operation, together with further objects and advantages thereof, may be understood by reference to the following description taken in connection with the accompanying drawing, in which:

FIG. 1 is a cross-sectional view of a safety valve incorporating the present invention; and FIG. 2 is an enlarged, fragmentary cross-sectional view of a portion of the valve of FIG. 1.

With reference to the drawing, a safety valve incorporating the present invention is shown as comprising a valve body 10 having a side outlet 12 which communicates at its inner end with an internal chamber 14 within the valve body. A nozzle 16 extends into the bottom of the valve body and provides an inlet flow path to the chamber 14. The nozzle 16 is provided at its upper end with a valve seat engageable with a generally complementally shaped seating surface on a valve disc 18 which serves to close the inlet to the valve when the disc is seated on the nozzle 16. The valve disc 18 is supported at the inner end of a valve stem 20 which extends inwardly of the valve body 10 and is movable toward and away from the valve seat and generally coaxially of the nozzle 16. The valve disc 18 is mounted for movement within a disc holder 22 which in turn is slidably supported and guided for movement within a generally tubular or cylindrical guide 24. The disc guide 24 is fixed relative to the valve body 10 and is maintained in assembly with the body 10 by means of a bonnet or the like 26 suitably fixed to the valve body 10. A preloaded coil compression spring 28 is disposed coaxially over the valve stem 20 with its lower end bearing upon a washer 30 rockably supported on a partispherical surface on the valve stem 20. The upper end of the spring 28 bears against suitable means, not shown, for providing a shoulder which is adjustable generally axially of the valve stem 20.

It will be apparent that with the inlet of the valve connected to a source of high-pressure steam, when the fluid pressure on the underside of the valve disc 18 and within the throat 16 exerts a force on the valve disc greater than the oppositely directed force provided by the spring 28, the valve disc 18 will move upwardly away from the valve seat as shown in FIG. 2 to permit flow of steam through what is referred to as the primary orifice of the valve and radially outwardly between the valve disc and seat. In FIG. 1 wherein the valve disc is seated the primary orifice is indicated as at X. As the steam discharges from between the disc and seat it impinges upon a generally horizontally extending surface 32 on the bottom of the valve disc holder 22, thus, to provide a substantially increased area of surface movable with the valve disc and on which the steam can act so as to provide a rapid movement of the disc toward full open position. This rapid movement of the disc is commonly referred to as the "popping" of the valve. Also carried by the valve disc holder is a generally annular skirt 34 which is fixed for movement with the disc holder 22 and thus the valve disc 18. In the specific embodiment shown, the skirt 34 is fixed for movement with the disc holder, although it might be adjustably mounted on the disc holder for movement generally axially thereof. However, as will be hereinafter explained, the position of the skirt 34 axially of the disc holder should not be adjusted except in accordance with particular criteria.

The inner surface of the skirt 34 provides a continuation of the surface 32 on the underside of the disc holder and then is directed downwardly, as at 36, so that the steam escaping from the primary orifice is constrained to follow a redirected flow path being confined between the portion 36 of the skirt 34 and the generally opposite facing surfaces on the adjusting ring 38 fixed to the nozzle 16. This redirection of the escaping steam provides a reaction effect on the skirt 34 and the disc holder 22 tending to move the valve disc in an upward direction away from the valve seat. The adjusting ring 38 is, as is well known, utilized for adjustment of the blowdown of the valve. While the ring 38 is adjustably generally axially of the nozzle 16, it is during operation of the valve fixed relative to the nozzle and thus the valve body.

The steam in the huddle chamber formed by the underside of the disc holder 22, the skirt 34 and the oppositely facing spaced surfaces on the adjusting ring 38 exits through what is referred to as the secondary orifice and into the chamber 14 within the valve body. The secondary orifice, which in FIGS. 1 and 2 is indicated generally at Y, is formed by the opposed surfaces on the skirt and adjusting ring adjacent the lower end of the skirt. In conventional valves the cooperating structure which forms the secondary orifice is arranged so that the orifice either remains constant during movement of the disc from a seated position to a full open position or the area of the secondary orifice increases as the valve disc rises. However, in accordance with the present invention the area of the secondary orifice decreases as the disc rises and more particularly decreases at a faster rate during the first portion of movement of the disc away from the seat than in the latter portion of disc movement.

From a consideration of FIGS. 1 and 2 it will be apparent that the generally vertically extending inner wall of the skirt 34 terminates in a frustoconical surface 40 which in turn terminates in a generally cylindrical surface 42. The conical or tapered surface extends downwardly and inwardly of the axis of the nozzle 16 and thus the valve seat, and the cylindrical surface 42 is disposed generally coaxially of the nozzle and the valve disc. The adjusting ring 38 is provided with a generally cylindrical surface 44 extending coaxially of the nozzle and in cooperation with the tapered surface 40 on the skirt forms the secondary orifice Y when the valve disc is seated. The secondary orifice is, of course, the flow area of least dimensions adjacent the lower end of the skirt. The ribs 46 on the adjusting ring 38 by means of which the adjusting ring is held in adjusted position by the locking member 48 are spaced apart from each other about the circumference of the ring so that the critical cross-sectional area forming the secondary orifice is between the conical surface 40 and cylindrical surface 44.

As the valve disc rises from the seat, the disc holder and thus the skirt 34 will also rise. Due to the relative inclination between the cooperating surfaces are the adjusting ring and skirt which form the secondary orifice, it will be apparent that the least distance between these surfaces will decrease as the disc rises, thus decreasing the effective cross-sectional area of the secondary orifice. When the disc reaches an intermediate lift position wherein the juncture between the conical surface 40 and cylindrical surface 42 on the skirt is the portion of the skirt closest to the lower edge of the cylindrical surface 44 on the adjusting ring, the secondary orifice will be formed by these two areas on the skirt and adjusting ring. Subsequently, on further lift of the disc the secondary orifice area will be determined by the spacing between the lower edge of the cylindrical surface 44 on the adjusting ring and the cylindrical surface 42 on the skirt, as shown in FIG. 2. Therefore, it will be apparent that during initial lift of the disc and during the time the size of the secondary orifice is governed by the spacing of the inclined surface 40 on the skirt holder from the cylindrical surface 44 on the adjusting ring, the rate of decrease in area of the secondary orifice will be greater than when this area is determined by the spacing of the cylindrical surfaces 42 and 44. In this connection it will be noted that when the disc is seated, the bottom edge of the surface 44 is above the juncture of the surfaces 40 and 42 on the skirt.

It will be apparent that when the disc is at full lift position as shown in FIG. 2, the cross-sectional area of the secondary orifice will be at its minimum value and will be substantially less than the cross-sectional area of the secondary orifice when the disc is seated. Accordingly, the reaction effect of the escaping steam is maintained at a near optimum value for the full movement of the disc toward open position and assures that the valve will fully open to achieve full capacity. On the other hand as the disc closes the secondary orifice will increase in area rather than decrease, so that when the pressure of the fluid in the nozzle 16 is reduced to and below the set pressure of the valve, the valve will close quickly with a short blowdown. It will further be observed that the flow area of the secondary orifice is at a predetermined minimum value when the disc is fully open. This value is selected to provide full opening of the valve. Accordingly, the valve should not be able to be adjusted to change the minimum area of the secondary orifice other than by authorized factory or service personnel. In this connection, in the specific embodiment shown, the skirt 34 is fixed relative to the disc holder 22.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a safety valve, a valve body providing a fluid path between an inlet and an outlet, a valve seat fixed in said path relative to said body, a movable valve disc engaged with said seat and movable away from said seat in response to urging of fluid pressure above a predetermined amount at said inlet, means providing a primary orifice in said path on the inlet side of said disc, first means in said path on the outlet side of said disc responsive to the presence of fluid pressure flowing past said disc when removed from said seat to aid disc movement away from said seat, said first means being movable with said disc and cooperating with second means fixed relative to said valve body defining a huddle chamber having an outlet orifice in fluid flow communication with said primary orifice when said disc is spaced from said seat, said first and second means including means providing a decrease in the area of said outlet orifice in response to movement of said valve disc over at least a portion of its travel away from said seat within the extent of cooperation between said first and second means.

2. In a safety valve according to claim 1 in which the outlet orifice of said huddle chamber has an area which is smaller at full lift of the disc than when the disc is seated.

3. In a safety valve, a valve body providing a fluid path between an inlet and an outlet including a valve seat, a valve disc engageable with said seat to close said path against fluid flow and supported for movement toward and away from the seat, said disc being movable away from said seat in response to urging of fluid pressure above a predetermined amount at said inlet and a skirt in said path on the outlet side of said disc responsive to the presence of fluid pressure flowing past said disc when removed from said seat to aid in disc movement away from said seat and extending generally away from said disc to past said seat for movement with the disc, said skirt having an inner surface cooperating with means fixed relative to the valve body to provide a secondary orifice with an effective flow area which reduces in response to movement of the valve disc over at least a portion of its movement away from said seat.

4. In a safety valve, a valve body providing a fluid path between an inlet and an outlet including a valve seat, a valve disc engageable with said seat to close said path against fluid flow and mounted for movement toward and away from said seat, said disc being movable away from said seat in response to urging of fluid pressure above a predetermined amount at said inlet, a skirt mounted for movement with said disc and extending in surrounding relation past said valve seat from the vicinity of said disc, an adjusting ring carried by the valve body and disposed coaxially about said valve seat in radially inwardly spaced relation to said skirt, and means providing said skirt and adjusting ring with generally opposed surfaces defining a secondary orifice, said opposed surfaces being geometrically related to provide said secondary orifice with an effective flow area which when the disc is spaced from the valve seat will be less than when the disc is seated.

5. In a safety valve as described in claim 4, said opposed surfaces being geometrically related to provide said secondary orifice with an effective flow area which progressively decreases as the disc moves away from said seat.

6. In a safety valve as described in claim 4, said opposed surfaces being geometrically related to provide said secondary orifice with an effective flow area which reduces at a first rate in response to movement of the disc from seated position to an intermediate lift position and reduces at a different second rate in response to movement of the disc from said intermediate lift position toward full lift position of the disc.

7. In a safety valve as described in claim 6, said first rate being greater than said second rate.

8. In a safety valve providing a fluid path between an inlet and an outlet, a valve seat, a valve disc supported disposed in said path opposite said seat to be moved away therefrom in response to urging of fluid pressure above a predetermined amount at said inlet, means forming a primary orifice in said path on the inlet side of said disc, and means in said path on the outlet side of said disc responsive to the presence of fluid pressure flowing past said disc when removed from said seat to aid disc movement away from said seat and including a surface movable with said disc providing a secondary orifice which decreases in area in response to movement of the disc away from seated position.

9. In a safety valve according to claim 8 in which the secondary orifice has an area which at full lift of the valve disc is less than when the disc is seated.

10. In a safety valve according to claim 8 in which said secondary orifice realizes a decrease in area at one rate over a first portion of the movement of the disc from seated toward full lift position and at a different rate over a second portion of the movement of the disc from seated toward full lift position.

11. In a safety valve according to claim 10 in which said first disc movement portion is from seated position to an intermediate raised position and said second disc movement portion is at a lesser rate from said intermediate position toward full lift position.

12. In a safety valve, a valve body providing a fluid path between an inlet and an outlet including a seat, a valve disc engageable with said seat to close said path against fluid flow and mounted for movement toward and away from said seat, said disc being movable away from said seat in response to urging of fluid pressure above a predetermined amount at said inlet, an annular skirt in said path on the outlet side of said disc responsive to the presence of fluid pressure flowing past said disc when removed from said seat to aid disc movement away from said seat, said skirt being supported surrounding said seat extending therepast in spaced relation thereto for movement with said disc and including an internal frustoconical surface disposed on a portion thereof past the valve seat relative to said disc extending in a direction inclined radially inward toward the terminal open end of the skirt, and means providing a cylindrical surface fixed relative to the valve body and disposed coaxially of said valve seat in the vicinity of said frustoconical surface, the edge of said cylindrical surface axially furthest from said valve seat cooperating with said frustoconical surface when said disc is seated to provide a secondary orifice for the valve with the end of said frustoconical surface axially furthest from said seat being spaced axially further from said seat than said recited edge of said cylindrical surface.

References Cited
UNITED STATES PATENTS

| | | | |
|---|---|---|---|
| 849,532 | 4/1907 | Coutant | 137—476 |
| 1,380,094 | 5/1921 | Clark | 137—478 X |
| 2,850,037 | 9/1958 | Van Fysbergen | 137—477 |

WILLIAM F. O'DEA, *Primary Examiner.*

H. W. WEAKLEY, *Assistant Examiner.*